United States Patent [19]

Fechalos et al.

[11] 4,435,620
[45] Mar. 6, 1984

[54] DIAL PULSE DELAY CIRCUIT

[75] Inventors: William A. Fechalos, Naperville; Carl J. Stehman, LaGrange, both of Ill.

[73] Assignee: Rockwell Int'l., Downers Grove, Ill.

[21] Appl. No.: 313,909

[22] Filed: Oct. 22, 1981

[51] Int. Cl.³ .......................... H04M 3/22; H04Q 1/32
[52] U.S. Cl. ................................................ 179/18 EB
[58] Field of Search ........ 179/18 AH, 18 EB, 16 EA; 340/825.64, 825.65, 825.67

[56] References Cited

U.S. PATENT DOCUMENTS

| | | | |
|---|---|---|---|
| 3,301,963 | 1/1967 | Lee et al. | 179/18 EB |
| 3,567,866 | 3/1971 | Briley et al. | 179/18 AH |
| 4,254,304 | 3/1981 | Fulghum et al. | 179/2 DP |
| 4,347,582 | 8/1982 | Frank | 364/900 |

FOREIGN PATENT DOCUMENTS

| | | | |
|---|---|---|---|
| 2543058 | 3/1977 | Fed. Rep. of Germany | 179/18 EB |
| 3001549 | 7/1981 | Fed. Rep. of Germany | 179/18 AH |

*Primary Examiner*—Thomas W. Brown
*Attorney, Agent, or Firm*—Carmen B. Patti; V. Lawrence Sewell; H. Frederick Hamann

[57] ABSTRACT

A telecommunication switching system utilizing immediate-start type trunks assures the collection of dial pulse information in receiving registers, via a network connection, by employing a dial pulse delay within each such trunk circuit for holding dial pulses a predetermined period of time before transferring the pulse information to the registers via the established network connection.

12 Claims, 4 Drawing Figures

DIAL PULSE DELAY CIRCUIT

BACKGROUND OF THE INVENTION

The present invention pertains generally to telephone common control switching systems and specifically to the dial pulse receiving equipment contained therein.

When a telephone call is placed from one telephone exchange to another, the latter must be capable of receiving and processing the dial pulse information irrespective of the dialing speed of the caller (now greatly enhanced by Touch Tone ® calling). In modern common control switching systems, this is accomplished by providing therein storage equipment for receiving and storing locally the dial pulse information generated by a local calling subscriber until a signal, such as a "wink start", is received from the foreign exchange serving the called subscriber indicating that a selected register in the foreign exchange is ready to receive the information.

When the calling exchange is of the older electromechanical type, such as a step-by-step system, a problem arises in that there is no capability provided for storing the information, so that the dial pulses are transmitted immediately upon generation by the calling party or exchange whether or not the called exchange has had sufficient time to assign and connect a register to receive the pulses.

Prior art common control switching systems overcome the foregoing problem through by-link circuits which are associated with the trunks connecting the switching systems to electromechanical systems and which are operated by the common control processor serving the switching system to expeditiously effect a direct connection from the trunk to a register, thereby bypassing the network and avoiding the delay (and possibly loss of dial pulse information) ensuing from the normal connection via the network as when the call is from another common control switching system. Aside from the additional by-link circuit equipment this arrangement requires, the common control processor is taxed by interrupting numerous other functions to perform the function of controlling that circuit when calls are received from the older electromechanical systems.

Accordingly, with the foregoing in mind, it is a primary object of the present invention to provide a method and apparatus for delaying the dial pulse information for a time sufficient to establish a trunk to register connection.

It is a related object of the present invention to delay dial pulse information by storing the information temporarily within the trunk circuit itself.

It is a further object of the present invention to provide an economical dial pulse storage circuit for use in telephone trunk circuits having both immediate start and delay dial capabilities.

It is a feature of the present invention to provide an n-bit wide random access memory for the delay-storage element, whereby such memory serves to delay dial pulse information for n number of trunk circuits.

It is a further feature of the present invention to provide a trunk circuit which automatically inserts a guard band time period before recognizing electrical transitions on the trunk line as dial pulses, when operating in the delay dial mode.

The foregoing objects as well as others, and means by which they are achieved through the present invention, may be best appreciated by referring to the detailed description which follows hereinafter together with the appended drawings.

BRIEF DESCRIPTION OF THE INVENTION

In accordance with the stated objects, the present invention employs digital delay means connected within a telecommunication trunk circuit signalling path. The delay means is comprised of a random access memory (RAM) wherein dialed digits are sequentially written, and a predetermined period of time later, read out onto the signalling path to be passed through a network connection to the final destination of a dial pulse register. The invention, operating autonomously and independant of any processor control, can thus be conveniently placed within a trunk signalling path to thereby delay the signalling information until it is assured that a register has been connected to receive such information. Particularly, dial pulse information, having durations in the millisecond range, appearing on the signal path is read into a recirculating memory at microsecond rates thus producing "samples" representative of dial pulse information. The memory write operation can then be considered as a mechanism for storing samples representative of dial pulse information. For each sample of dial pulse information, a bit is stored during a memory "write" cycle; then a delay period later such bit is read during a memory "read" cycle and transferred to the internal trunk signalling path. In this manner, each sample bit is subjected to one full delay period before being read, to thereby provide the requisite digital delay. The address range of the memory device and the rate at which the device is addressed primarily determines the amount of delay each bit of dial pulse information undergoes.

In the preferred embodiment the storage element is comprised of a static 1024×4 random access memory (RAM) having a write cycle every 500 microseconds. A 1024 modulus address counter sequentially addresses the memory such that each bit of dial pulse information, which was entered during its write cycle, is read out approximately 0.5 second later. During each memory period in which 1024 addresses are read there are a corresponding 1024 intervals having a read and write cycle such that for each address, delayed information is first read out and new information, to be delayed, is then written therein.

The illustrated embodiment also contains control circuitry responsive to the expiration of the wink start and stop dial signals to generate a guard band in which those spurious electrical signals present on the trunk line during the guard band time period are disregarded. The illustrated trunk delay circuit is thus applicable to situations involving both immediate start and delay dial situation. While signalling pulses experience a memory delay in both applications, such a delay, in the delay dial situation is inconsequential and thus no timing constraints or system violations are encountered.

DETAILED DESCRIPTION OF THE PREFERRED EMBODIMENT

Figure 1:
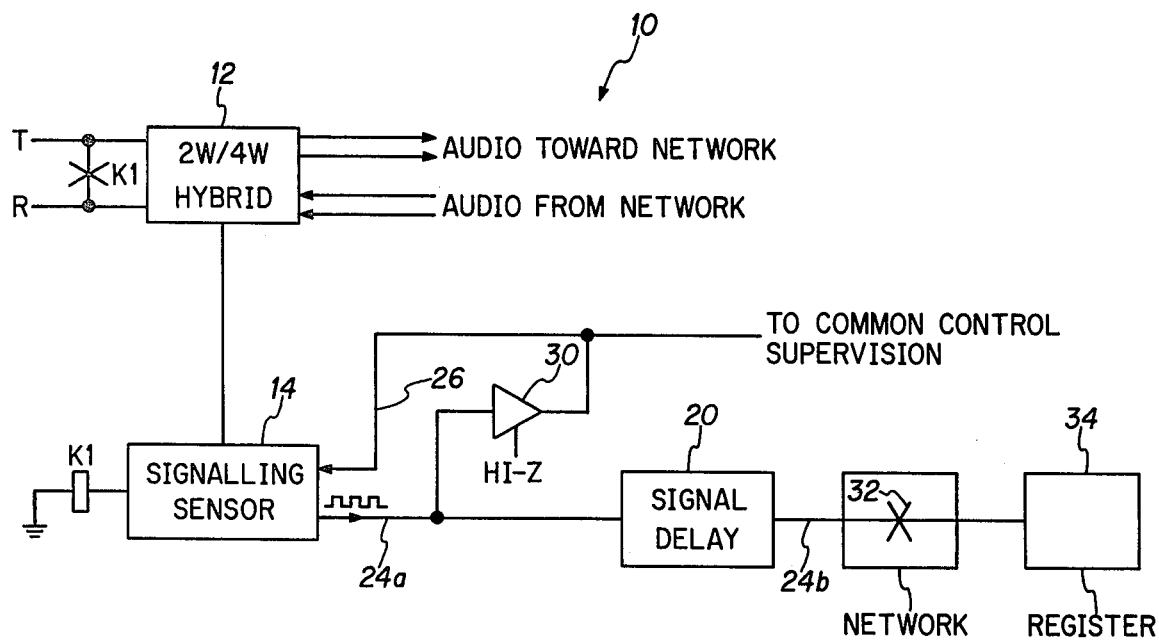
FIG. 1 is a block diagram of an exemplary telecommunications trunk circuit providing an environment for the present invention.

Turning now to FIG. 1 there is shown an environment in which the present invention may be practiced. As previously noted, the present invention is especially advantageous in the trunk circuits of a common controlled switching system which is in direct connection with either a customer controlled or another common controlled switching system. The trunk circuit of FIG. 1 typically provides an interface between the communication voice line and the switching system voice and signalling circuits. Such a trunk generally includes a two-wire to four-wire hybrid 12 for deriving unidirectional transmit and receive channels from the bidirectional tip and ring wires. The exemplary trunk circuit 10 also includes a signalling sensor 14 which directs the signalling information from the hybrid circuit 12 to registers for storing signal pulses, and to processor sense points for trunk supervision. At the point of processor supervision, signalling information in the form of on-hook and off-hook transitions are recognized by the common control processor, and in response thereto, the control establishes a network connection 32 between the trunk signal path 24b and an idle dial pulse register 34. As previously noted, in a conventional circuit operating in the immediate start mode, signalling information may be lost in the event a dial pulse register is not immediately connected to receive dial pulses present on the signalling path 24b. This problem is obviated by the provision of the signal delay circuit 20 inserted within the signalling path 24a,b.

It should be noted that the common control, in monitoring the signalling sense point 26, is configured to recognize on-hook and off-hook information yet ignore dial pulses which have substantially higher repetition rates. The common control is also capable of communicating to the trunk circuit 10 by way of the sense point 26 to, for instance, produce a tip and ring loop closure by supplying appropriate information to the signalling sensor 14 to operate relay K1. Appropriate operation of a tri-state driver 30 allows bidirectional processor communications with the trunk circuit 10. The particular circuit operation of trunk hybrids and signalling sensors are well known to those skilled in the art and thus need not be further delineated here.

Figure 2:
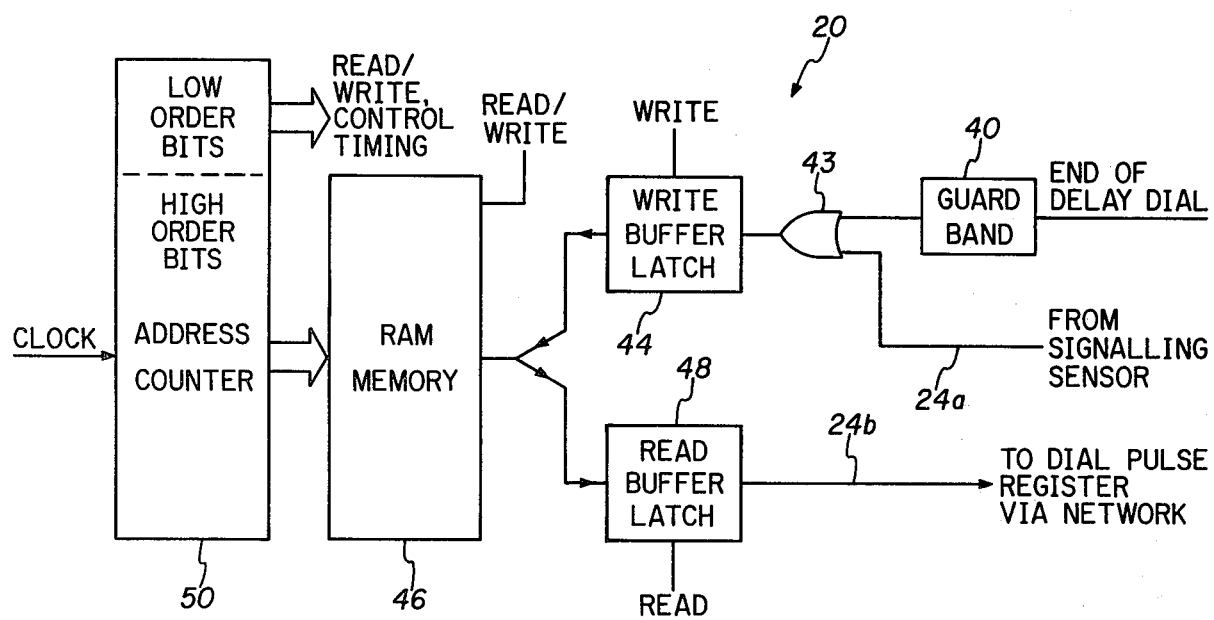
FIG. 2 is a block diagram of the trunk signal delay circuit illustrating the serial nature of delay interposed between the signalling sensor and the dial pulse register.

With reference now to FIG. 2 there is shown a block diagram of the preferred embodiment of the signalling delay circuit. As previously noted, the preferred embodiment makes provision for a predetermined time period (acknowledgement guard band) whereby the delay memory 46 is inhibited from entering any information within such time period. The guard band circuit 40 is responsive to the expiration of the wink start and stop dial signals generated by the other switching systems, to control the inhibiter 43 and thereby prevent information from being entered into the signal delay circuit during the guard band time period. A tri-state write buffer latch 44 is provided to temporarily hold signalling information before being written into the delay memory 46. Similarly, there is provided a read buffer storage latch 48 for signal information read out of the delay memory 46. Such a read buffer latch 48 is desirable to restore the integrity of the individual pulse waveforms while memory read and write cycles are being performed. Significantly, the 1024 bit RAM memory 46 is driven by a 1024 modulus address counter 50. The address counter 50, which is comprised of low order bits for read/write control and ten high order memory address bits, isochronously addresses each memory location at periodic intervals and, in the illustrated embodiment, at 500 microsecond intervals.

Figure 3:
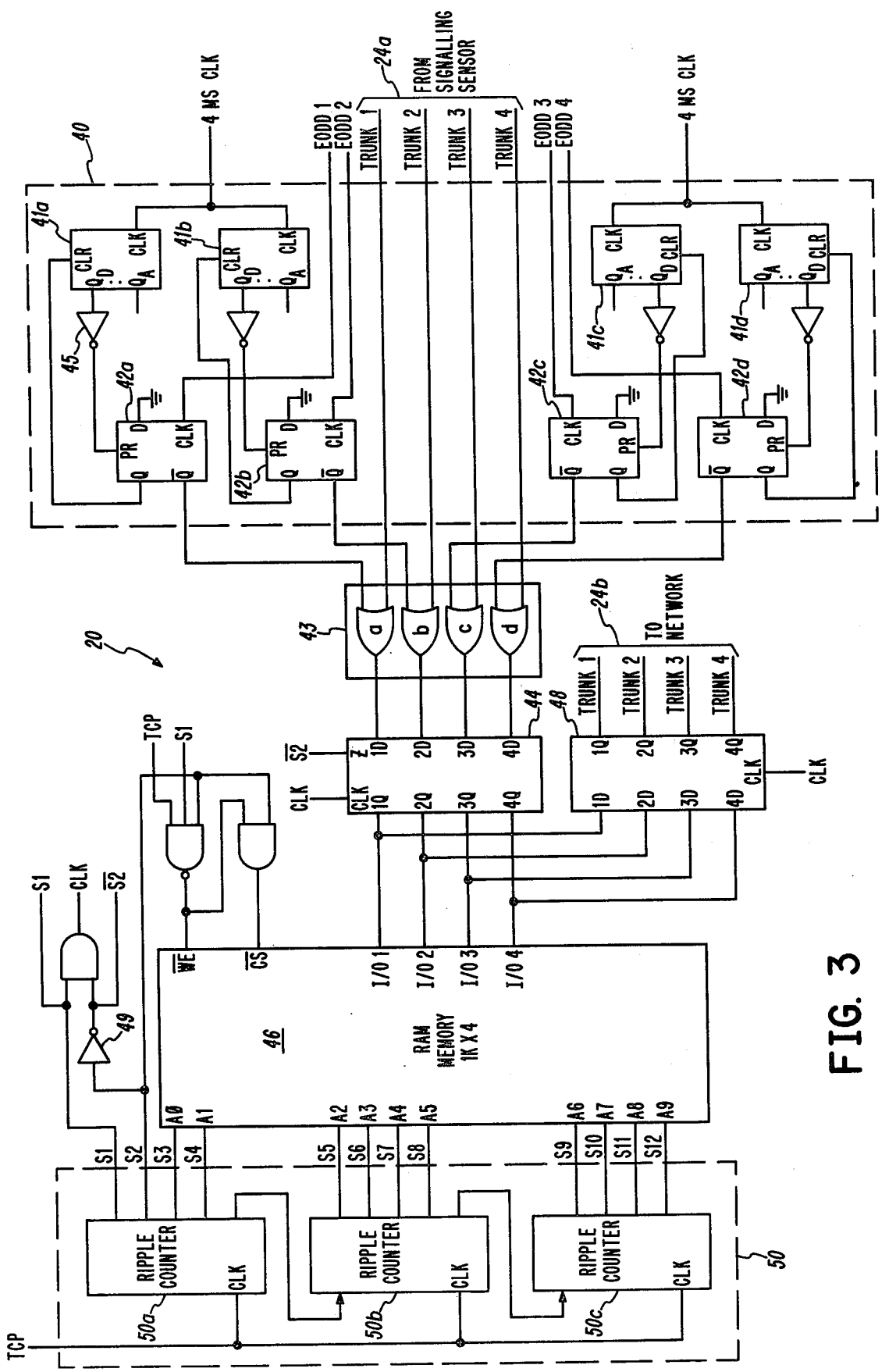
FIG. 3 is a detailed schematic drawing showing a single signalling delay memory and the supporting circuitry all providing delay and inhibit functions for four trunk circuits.
Figure 4:
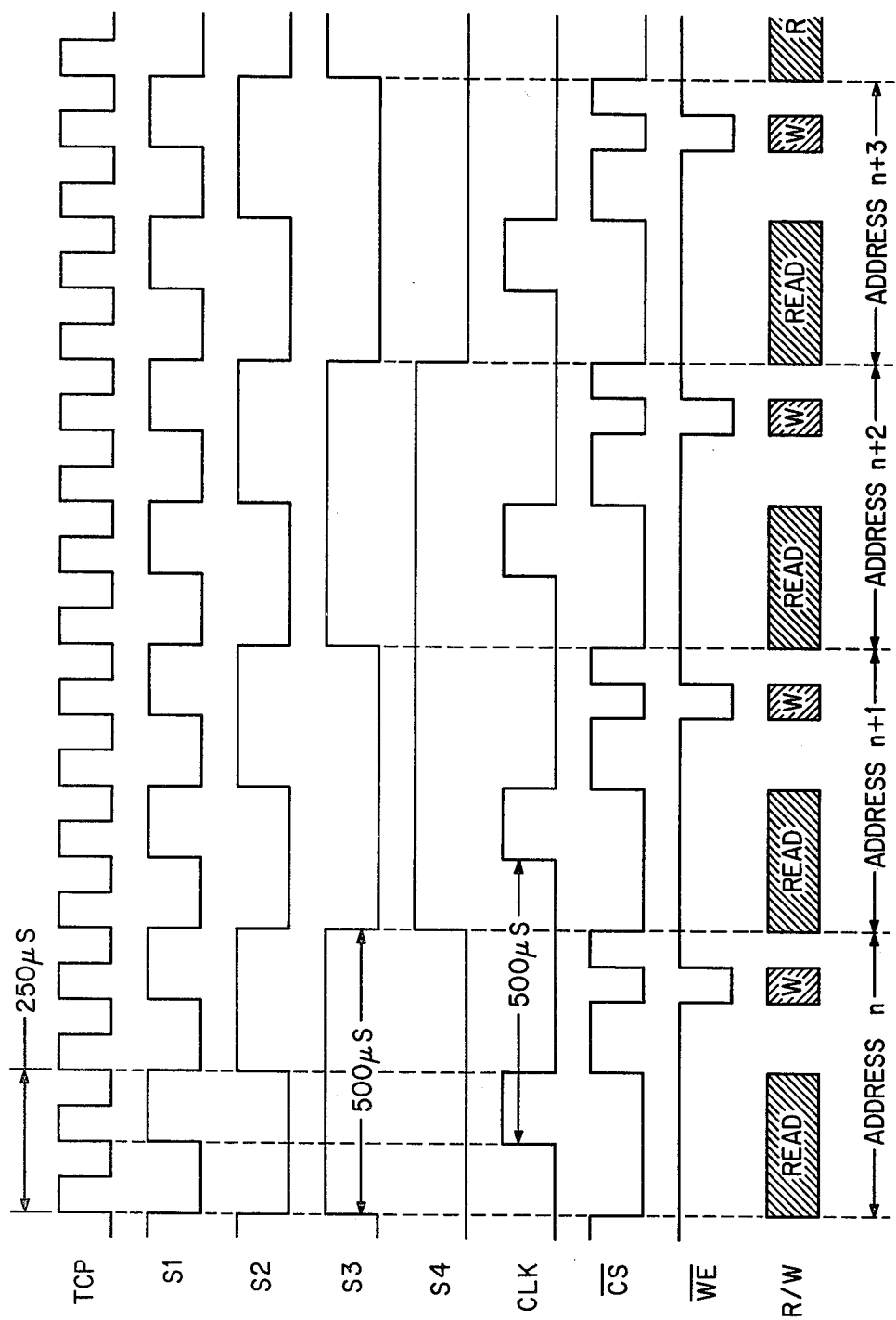
FIG. 4 is a diagram which illustrates the waveforms and the relative timing therebetween of the various signals which are utilized in controlling the operations of the preferred embodiment as shown in FIG. 3.

Viewing FIG. 3 in conjunction with FIG. 4 there are depicted the operational details of the dial pulse delay line. The delay memory 46 is a 1K×4 RAM which advantageously accommodates four input signal paths 24a, and thus four trunk circuits. This aspect is particularly desirable in view that circuit miniaturization techniques have allowed at least this number of trunk circuits to be conveniently placed on one printed circuit board of moderate size. One may extend the memory to even more bits per addressable location to accommodate more trunks; the physical size of such larger memory compared to the 1K×4 becomes de minimus compared to the circuit board size.

With specific reference to the guard band circuits 40 of FIG. 3, there are shown four identical circuits each of which is associated with one trunk input signal line 24a. In the event one, two, . . . or all of the associated trunks are connected to trunk lines having wink start or stop dial signalling capabilities, such delay dial signals may be connected through a simple interface to the EODDX (End Of Delay Dial) leads as shown in the right hand portion of FIG. 3. Such an interface (not shown) can simply be an appropriate combination of logic gates to transform the expiration of the wink start and stop dial signals to logic levels of the correct phase to clock the inhibit flip-flops 42a-42d. Thus, those skilled in the art will find it a simple matter to design appropriate circuitry to interface the illustrated guard band circuits to delay dial signals or to other similar signals.

In accordance with the objects of the present invention it will be realized that the circuit of FIG. 3 may be used with a mixture of trunks, some of which require guard bands and others which do not. Simply stated, if any EODDX lead is left unwired, the information then present on the associated trunk line 24a will automatically undergo a delay by way of the delay memory 46. In view that the functional operation of each of the four illustrated guard band circuits is identical, the following discussion will describe in detail only one such circuit.

Functionally, the EODD1 lead, normally in the logic low state, actuates its associated guard band circuit by a low-to-high transition. This end of delay dial indication conditions the inhibit flip-flop 42a so that a $\bar{Q}$ logic high is forced on the corresponding OR gate 43 lead to inhibit logic information from propagating through the gate. More particularly, the rising edge of EODD1 transfers the digital state of the latch 42a D-input (logic low) to the Q output, which output in turn removes the logic high from the CLR input of the 32 ms ripple counter 41a. The logic low now on the CLR lead of the 32 ms counter 41a allows the counter to commence counting the 4 ms CLK pulses until (8 counts later) the $Q_D$ output reaches a high state. As a result, the preset (PR) terminal of flip-flop 42a is driven low by way of the intermediate inverter gate 45. The activation of the preset (PR) input forces its Q output high, thereby closing the loop and clearing the 32 ms counter which prevents it from further counting. In addition and concurrently, the $\overline{Q}$ output of flip-flop 42a is forced low to then allow signalling information on the respective input signalling path 24a (trunk 1) to pass through the logic OR gate 43a. It should be noted that the delay circuit, configured with OR gates 43, produces an idle high logic state. Dial pulse low levels produce corresponding low levels at the read buffer latch 48 output.

Therefore, the foregoing guard band circuit is well adapted for use in those applications where it is required to ignore spurious signals on the trunk line for a brief period of time preceding an externally generated event.

With brief reference now to the address counter 50 there are shown three synchronous ripple counters connected to form, in part, a 1024 modulous counter. Each of the higher order ten states (S3–S12) represents an address to a particular memory 46 location. The address counter 50 is driven by an 8 KHz clock signal (TCP), which signal is generally available in most PCM switching systems for cyclically sampling voice signals. The repitition rate of the 8 KHz clock is 125 microseconds as shown in FIG. 4. The S1 and S2 outputs of the first ripple counter 50a are utilized to derive memory read and write signals and to control other circuits operations.

For illustrative purposes FIG. 4 shows only the two lower order memory address bits (S3,S4) which serve to establish waveform reference points so that the memory read and write cycles may be more easily understood. Viewing FIG. 3 in conjunction with the waveforms of FIG. 4, and concentrating on the memory read and write intervals (cross-hatched areas at the bottom of FIG. 4), it is observed that each address cycle n, n+1, ... is comprised of first a memory read operation followed by a write operation. Such cycles repetitively occur every 500 us wherein the logic amplitude (one or zero) previously stored is first read from the memory 46, and later, within the same cycle, the same location is updated by a write operation with new pulse amplitude information then present on the input line 24a.

The memory write cycles are designed to "sample" the pulse information on the respective trunk signal input lines 24a every 500 us. Dial pulse information with much lower duty cycles (dial pulses 40 ms-on, 60 ms-off) cannot then be overlooked by the delay circuit 20. Moreover, since every memory location is read and then written once every 512 ms (500 us×1024), each stored bit undergoes a delay, which in the case of immediate start trunk applications is necessary; however, in this case the guard band circuit is not activated.

With particular reference to the memory operations, it is relevant to note that one of the many memory devices acceptable for use in the present invention is the Intel 2114 1024×4 bit static RAM. Such a memory device requires the chip select (CS) input to be at a logic low for read and write operations. Additionally, for read operations the write enable (WE) input should be at a logic high, and for write operations a logic low. Referring to FIG. 4, the foregoing criterion for a read operation is satisfied during the first 250 microseconds of each address interval. However, for smooth movement of data information out of the memory 46 via the bidirectional I/O leads, the input buffer latch 44 must be in a high impedance state. The "Z" lead of the buffer latch 44 forces its outputs into the high impedance state when at a logic high level. It should be noted that the "Z" lead is controlled by the S2 counter output which, when inverted by gate 49, provides the requisite logic high during the read portion of each memory address cycle.

Focusing attention now on the CLK function, it should be observed that such waveform becomes active during the read operation, yet controls both the input and output buffer latches 44,48. During the last half of the read operation, and while the memory output is stable, the CLK lead latches the delayed memory bits into the read buffer latch 48 to update the logic level on the output trunk lines 24b. In a sense, the read buffer latch performs a filtering function in that the output voltage level remains at a constant level for entire signal pulse durations (the 40 ms high, 60 ms low) irrespective of the memory I/O data transitions occuring on its input. While the CLK lead effects an update of the read buffer latch 48, it also updates the write buffer latch 44, (of the type having high impedance output states) with data representative of the present digital status of the input signal lines 24a.

Having updated the write buffer latch 44 and read out the fully delayed information, the memory location is ready to store new information to be delayed. FIG. 4 indicates that 250 us into the memory address cycle S2 goes high, and when inverted, removes the high impedance output state of the write buffer latch 44. The latched data is then available to the memory I/O leads in preparation of the memory write cycle. Approximately 62.5 microseconds (one TCP pulse width) after removal of the buffer latch hi-Z state, the CS and WE memory inputs are driven low to initiate the memory write cycle as shown by the short cross-hatched areas at the bottom of FIG. 4. The memory 46 write cycle occupies approximately 62.5 us of the latter portion of each address cycle to store the repetitive samples of signalling information. The illustrated RAM memory being one bit wide for each trunk signal line, is capable of storing a logic zero and one to represent the logic state of each sample taken from the input signalling line 24a. To that end, only chopped portions of each signalling pulse undergo delay, yet at a sampling rate of 500 ms a high degree of resolution is achieved to very accurately reconstruct the original pulse waveform by way of the output buffer latch 48.

Thus, it is seen that the invention herein affords a way to accommodate both immediate start and dial delay type trunks with only one circuit which is easily manufactured with standard digital components and requires only a small amount of circuit board area. For both mentioned applications the disclosed delay circuit is simply interposed within the trunk signal path to automatically adapt itself, without initiation or intervention by the switching system, to delay all digital information present on the signal path a predetermined period of time. Furthermore, the common control need make no special provisions nor depart from normal operations to distinguish the trunk types for receiving signalling information.

With the foregoing principles in mind, it should be noted that while actual portions of pulse widths are stored and regenerated, that aspect is not the sole manner in which the invention may be practiced. For example, a delay means may include means for noting the presence of whole pulses, and after a brief period of time, generating a new pulse without ever having to store likenesses of the original pulse waveform. However, this method suffers in that different pulse widths are not easily regenerated. The present invention, however, is capable of regenerating different pulse widths with a resolution dependent on the memory write rate.

In any such system as the foregoing, many changes can be made which are not relevant to the novel features taught by the present invention. Bearing this in mind, the specific embodiment discloed herein is intended to be merely exemplary of the invention and not restrictive thereof, since various modifications readily apparent to those familiar with the art can obviously be made without departing from the spirit and scope of the invention as claimed hereinbelow.

What we claim is:

1. A dial pulse delay circuit for use in combination with a common control telephone switching system having a plurality of trunks, a plurality of registers, and a switching network for providing selective connections between said trunks and registers, one register of which is assigned to receive dial pulse information received by way of one of said plurality of trunks, comprising:
means for delaying dial pulse information for a period during which one of said registers is assigned and connected to receive said dial pulse information, a different one of said means for delaying associated with each one of said plurality of trunks;
means for storing said dial pulse information;
means for transferring said stored dial pulse information to the assigned register after its connection to receive said information is effected; and
means for sampling for cyclically producing dial pulse information amplitude data at a rate of at least twice the expected dial pulse information rate.

2. The delay circuit as set forth in claim 1 wherein said sampling means is comprised of a writeable memory having a data input connected to said one trunk, and enabling means for writing said amplitude data into said memory at the sampling means rate.

3. The delay circuit as set forth in claim 2 wherein said writeable memory is comprised of a random access memory having n bit storage locations, and wherein said sampling means includes a counter means for sequentially addressing each of said random access memory storage locations, and wherein said enabling means includes means for writing each addressed location with the dial pulse amplitude data, and the action of said counter means having the further consequence that a predetermined period of time after each said location is written said random access memory is addressed in the same sequence as for writing, and said enabling means further including means for reading each addressed location, whereby the amplitude envelope of the memory contents read during the memory read operation resembles the trunk dial pulse information.

4. The delay circuit as set forth in claim 3 wherein said random access memory includes a plurality of data input terminals each associated with a different memory storage cell in each addressable location, each said input terminal being associated with a different one of said plurality of trunks, whereby said random access memory and counter means and enabling means associated therewith service a plurality of trunks.

5. The delay circuit as set forth in claim 3 wherein said storing means includes a clock means for driving said counter means to thereby address said random access memory, wherein said clock means operates asynchronously with said switching network so that said delay circuit is free running and may be implemented with minimal circuit connections.

6. The delay circuit as set forth in claim 3 further including filtering means, connected to a data output terminal of said random access memory, for maintaining the dc level of bits read from said random access memory.

7. The delay circuit as set forth in claim 3 wherein said counter means is comprised of a free-running n-modulus counter, whereby each memory address is generated once for each said predetermined period of time.

8. The digital delay circuit as set forth in claim 3 further including inhibit means, responsive to signals generated by the common control of said system, for preventing the entry of information on said trunk into said storing means.

9. A method of delaying dial pulse information in a common control telephone switching system having a plurality of trunks, a plurality of registers, and a switching network for providing selective connections between said trunks and registers, one register of which is assigned to receive dial pulse information received by way of one of said plurality of trunks, comprising the steps of,
delaying said dial pulse information for a period during which one of said registers is assigned and connected to receive said dial pulse information;
storing said dial pulse information;
transferring said stored dial pulse information to the assigned register after its connection to receive said information is effected;
cyclically sampling the waveform amplitude of the dial pulse information at a rate at least twice the expected dial pulse rate;
producing a plurality of digital representations of the resulting amplitude samples, and storing said digital representations; and
recalling said stored digital representations in the sequence and at the rate stored.

10. The method as set forth in claim 9 wherein said storing step comprises cyclically sampling the waveform amplitudes of dial pulses of the dial pulse information at a rate at least twice the expected dial pulse rate, producing digital representations of the resulting amplitude samples, and storing said digital representations, and
said transferring step comprises recalling said stored digital representations in the sequence and at the rate stored.

11. The method as set forth in claim 10 further including the step of filtering the recalled digital representations in such a way that the amplitude envelope of the resultant waveform is similar to dial pulses and interpulse spaces of which said dial pulse information is comprised.

12. The method as set forth in claim 11 wherein each of said digital representations is stored in a different memory element, and wherein said storing and transferring steps further include, for each said element and once for each sample cycle, first transferring the stored digital representation and then storing therein a new digital representation.

* * * * *